(12) United States Patent
Brown et al.

(10) Patent No.: US 10,988,061 B2
(45) Date of Patent: Apr. 27, 2021

(54) RESIN TIP-UP SEAT CUSHION FRAMES AND SEAT ASSEMBLIES HAVING RESIN TIP-UP SEAT CUSHION FRAMES

(71) Applicant: Toyota Motor Engineering & Manufacturing North America, Inc., Plano, TX (US)

(72) Inventors: Shelby L. Brown, Brighton, MI (US); Yi-Ru C. Sosnowski, Ann Arbor, MI (US); John Salvia, Ann Arbor, MI (US); Vikas Bhatia, South Lyon, MI (US); Gregory T. Donovan, Britton, MI (US); Patrick J. Edgar, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/429,541

(22) Filed: Jun. 3, 2019

(65) Prior Publication Data

US 2020/0376990 A1 Dec. 3, 2020

(51) Int. Cl.
*B60N 2/42* (2006.01)
*B60N 2/427* (2006.01)
*B60N 2/30* (2006.01)
*B60N 2/56* (2006.01)
*B60N 2/68* (2006.01)

(52) U.S. Cl.
CPC ....... *B60N 2/42718* (2013.01); *B60N 2/3047* (2013.01); *B60N 2/5621* (2013.01); *B60N 2/686* (2013.01)

(58) Field of Classification Search
CPC .............. B60N 2/42718; B60N 2/3047; B60N 2/5621; B60N 2/686; B61D 33/0085; A47C 1/121
See application file for complete search history.

(56) References Cited

U.S. PATENT DOCUMENTS

| | | | |
|---|---|---|---|
| 5,400,490 A * | 3/1995 | Burchi | B29C 44/08 29/91.1 |
| 5,472,260 A | 12/1995 | Czapski et al. | |
| 6,419,313 B1 * | 7/2002 | Newman | B60N 2/70 296/37.15 |
| 7,300,102 B2 | 11/2007 | Gupta et al. | |
| 7,377,586 B2 * | 5/2008 | Evans | B60N 2/3013 297/248 |
| 7,607,739 B2 * | 10/2009 | Browne | B60N 2/5621 297/180.1 |
| 9,180,791 B2 | 11/2015 | Hawkins et al. | |

(Continued)

FOREIGN PATENT DOCUMENTS

| | | |
|---|---|---|
| JP | 2018039513 A | 3/2018 |
| JP | 2018090143 A | 6/2018 |

*Primary Examiner* — Philip F Gabler
(74) *Attorney, Agent, or Firm* — Dinsmore & Shohl LLP

(57) ABSTRACT

A seat cushion, for a seat assembly, includes a seat cushion frame formed of a resin material. The seat cushion frame includes a base wall, a pair of side walls, and a front wall. The base wall includes a pair of side edges and a front edge that extends between the pair of side edges. The pair of side walls extend outward from the pair of side edges of the base wall. The front wall extends outwardly from the front edge of the base wall. The front wall configured to provide an anti-submarining feature.

19 Claims, 3 Drawing Sheets

(56) References Cited

U.S. PATENT DOCUMENTS

| | | | |
|---|---|---|---|
| 9,327,631 B2 | 5/2016 | Yamaguchi et al. | |
| 9,623,770 B2 | 4/2017 | Furuta | |
| 10,086,766 B2 * | 10/2018 | Osterhoff | B60N 2/682 |
| 2019/0351798 A1 * | 11/2019 | Bhatia | B60N 2/686 |

* cited by examiner

RESIN TIP-UP SEAT CUSHION FRAMES AND SEAT ASSEMBLIES HAVING RESIN TIP-UP SEAT CUSHION FRAMES

TECHNICAL FIELD

The present specification generally relates to seat assemblies and, more specifically, to seat assemblies that include tip-up seat cushion frames formed of a resin material.

BACKGROUND

It has been known to provide vehicles with seat assemblies with a stadium style seat cushion moveable between a use position and a tip-up position. The previously known seat assemblies include seat cushion formed with metallic frames. However, the previously known metallic tip-up seat cushion frames result in an increase in cost and weight of the vehicle. Moreover, the previously known metallic tip-up seat cushion frames do not include an integrated anti-submarining feature to prevent a lower portion of an occupant from sinking into the seat cushion during a collision. Further, the previously known metallic tip-up seat cushion frames require mounting brackets for the attachment of accessories.

Accordingly, there is a need for a seat assembly that includes a resin tip-up seat cushion frame which includes an integrated anti-submarining feature and an integrated accessory attachment.

SUMMARY

In one embodiment, a seat cushion, for a seat assembly, includes a seat cushion frame formed of a resin material. The seat cushion frame includes a base wall, a pair of side walls, and a front wall. The base wall includes a pair of side edges and a front edge that extends between the pair of side edges. The pair of side walls extend outward from the pair of side edges of the base wall. The front wall extends outwardly from the front edge of the base wall. The front wall configured to provide an anti-submarining feature.

In another embodiment, a seat assembly includes a seat back and a seat cushion frame pivotally coupled to the seat back. The seat cushion frame being formed of a resin material. The seat cushion frame includes a base wall, a pair of side walls, and a front wall. The base wall includes a pair of side edges and a front edge that extends between the pair of side edges. The pair of side walls extend outward from the pair of side edges of the base wall. The front wall extends outwardly from the front edge of the base wall. The front wall configured to provide an anti-submarining feature.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
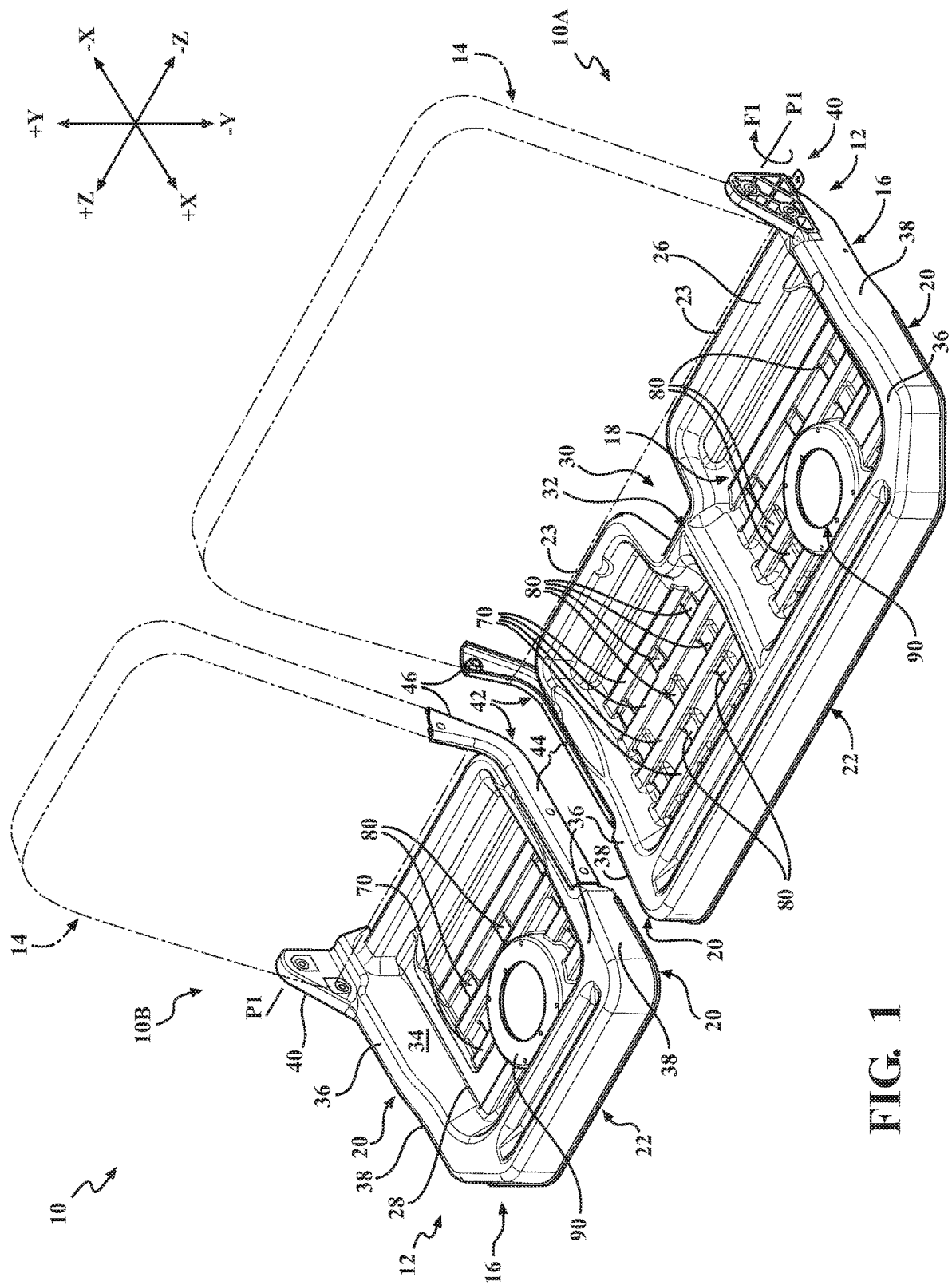
FIG. 1 schematically depicts a perspective view of a seat assembly having a resin tip-up seat cushion frame according to one or more embodiments shown or described herein.

A seat cushion, for a seat assembly, according to the present specification includes a seat cushion frame formed of a resin material. The seat cushion frame includes a base wall, a pair of side walls, and a front wall. The base wall includes a pair of side edges and a front edge that extends between the pair of side edges. The pair of side walls extend outward from the pair of side edges of the base wall. The front wall extends outwardly from the front edge of the base wall. The front wall configured to provide an anti-submarining feature.

A seat assembly according to the present specification includes a seat back and a seat cushion frame pivotally coupled to the seat back. The seat cushion frame being formed of a resin material. The seat cushion frame includes a base wall, a pair of side walls, and a front wall. The base wall includes a pair of side edges and a front edge that extends between the pair of side edges. The pair of side walls extend outward from the pair of side edges of the base wall. The front wall extends outwardly from the front edge of the base wall. The front wall configured to provide an anti-submarining feature.

As used herein, the term "vehicle longitudinal direction" refers to the forward-rearward direction of the vehicle (i.e., in the +/−vehicle X-direction as depicted). The term "vehicle lateral direction" refers to the cross-vehicle direction of the vehicle (i.e., in the +/−vehicle Z-direction as depicted), and is transverse to the vehicle longitudinal direction. The term "vehicle vertical direction" refers to the upward-downward direction of the vehicle (i.e., in the +/−vehicle Y-direction as depicted). As used herein, "upper" and "above" are defined as the positive Y direction of the coordinate axis shown in the drawings. "Lower" and "below" are defined as the negative Y direction of the coordinate axis shown in the drawings. Further, the terms "outboard" as used herein refers to the relative location of a component with respect to a vehicle centerline. The term "inboard" as used herein refers to the relative location of a component with respect to the vehicle centerline. Because the vehicle structures may be generally symmetrical about the vehicle centerline, the direction to which use of terms "inboard" or "outboard" and refer may be mirrored about the vehicle centerline when evaluating components positioned along opposite sides.

Referring now to FIG. 1, a seat assembly 10 is generally depicted. In some embodiments, the seat assembly 10 is provided within a vehicle. In some embodiments, the vehicle is a truck. In some embodiments, the vehicle may be a car, a sport utility vehicle, a van, a boat, a plane, or other vehicle types.

In the illustrated embodiment, the seat assembly 10 is configured as a rear 60/40 seat that includes a first seat assembly 10A and a second seat assembly 10B. The seat assembly 10 is configured to support three occupants above a floor of the vehicle. Specifically, the first seat assembly 10A is configured as the "60" seat to support an occupant on an outer portion of the first seat assembly 10A, in the vehicle lateral direction, and an occupant on an inner portion of the first seat assembly 10A, in the vehicle lateral direction. The second seat assembly 10B is configured as the "40" seat to support a single occupant. It is appreciated that the seat assembly 10 is not limited to the "60/40" seat. Specifically, the seat assembly 10 is optionally provided in a "50/50" seat, a captain type seat, a bucket type seat, or other various seat assemblies.

As the second seat assembly 10B is substantially similar to the first seat assembly 10A, description of the first seat assembly 10A will be provided. The first seat assembly 10A includes a seat cushion 12 and a seat back 14. The seat cushion 12 includes a seat cushion frame 16 formed of a resin material. The seat cushion frame 16 is pivotally coupled to the seat back 14 for movement about a pivot axis P1. In some embodiments, the seat cushion frame 16 is pivotal between a seated position and a tip-up position. In the seated position, the seat cushion frame 16 is positioned so as to support an occupant above the floor of the vehicle. In the tip-up position, the seat cushion frame 16 is pivoted about the pivot axis P1 in the direction of arrow F1 towards the seat back 14. In the tip-up position, the seat cushion frame 16 faces the seat back 14.

Figure 2:
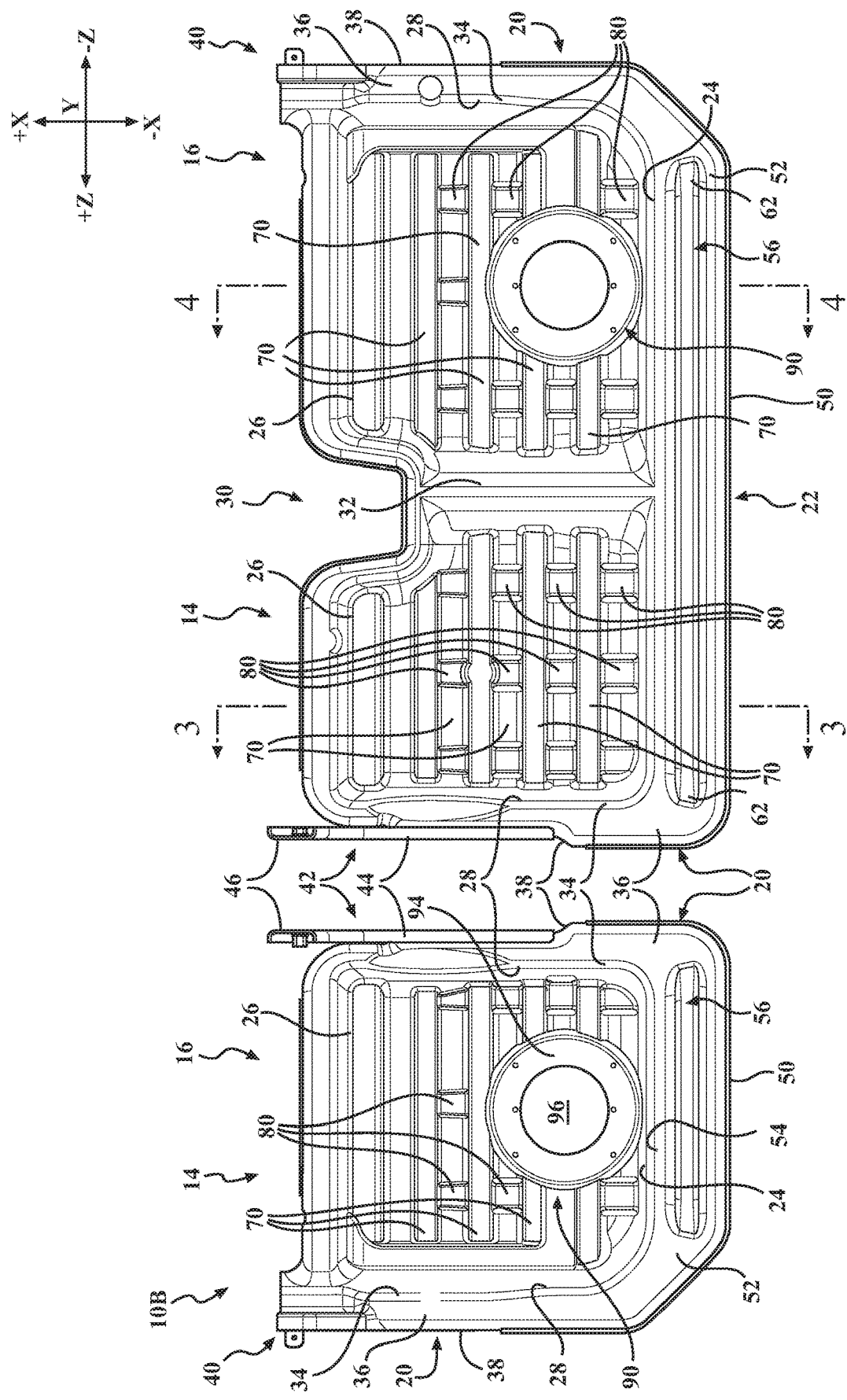
FIG. 2 schematically depicts a top view of the resin tip-up seat cushion frame according to one or more embodiments shown or described herein.

Referring to FIGS. 1 and 2, the seat cushion frame includes a base wall 18, a pair of side walls 20, a front wall 22, and an opposite rear wall 23. The pair of side walls 20, the front wall 22, and the rear wall 23 are formed so as bound a perimeter of the base wall 18. The base wall 18 includes an upper surface 18A, a front edge 24, and opposite rear edge 26, and a pair of side edges 28 that extend between the front edge 24 and the rear edge 26. The base wall 18 may include a notched portion 30 that extends from the rear edge 26 of the base wall 18 forward in the vehicle longitudinal direction. The notched portion 30 provides access for the seatbelt buckles or other seat accessories to the occupants supported by the seat cushion frame 16.

The seat cushion frame 16 may also include an intermediate ridge 32 that extend between the rear edge 26 of the base wall 18 at the notched portion 30 to the front edge 24 of the base wall 18. The intermediate ridge 32 is formed as a portion of the base wall 18 that extends upwardly in the vehicle lateral direction when the seat cushion frame 16 is in the seated position. The intermediate ridge 32 provides for reinforcement of the seat cushion frame 16 in an area between where occupants will be supported.

Each of the pair of side walls 20 includes an inner side wall 34, a top side wall 36, and an outer side wall 38. The inner side wall 34 extends generally upwardly from the side edge 28 of the base wall in the vehicle vertical direction when the seat cushion frame 16 is in the seated position. The top side wall 36 extends generally outwardly from an upper edge of the inner side wall 34. The outer side wall 38 extends generally downwardly from an outer edge of the top side wall 36. The top side wall 36 is provided such that an inner edge connects to the upper edge of the inner side wall 34 and an opposite outer edge of the top side wall 36 connects to an upper edge of the outer side wall 38.

The side wall 20 disposed on an outboard side of the seat cushion frame 16, in the vehicle lateral direction, is provided with an outer bracket 40. As will be discussed in greater detail below, the outer bracket 40 is formed integrally as a one piece monolithic structure with the outboard side wall 20. The outer bracket 40 includes attachment components configured to pivotally attach the seat cushion frame 16 to the seat back 14. The outer bracket 40 extends generally upwards, in the vehicle vertical direction when the seat cushion frame 16 is in the seated position, above the top side wall 36. In some embodiments, the outer bracket 40 includes a generally triangular shape.

The side wall 20 disposed on an inboard side of the seat cushion frame 16, in the vehicle lateral direction, is provided with an inner bracket 42. The inner bracket 42 is formed as a separate component from the seat cushion frame 16. In some embodiments, the inner bracket 42 is formed of a metallic or metallic alloy material illustratively including steel, steel alloy, aluminum, or aluminum alloy. The inner bracket 42 includes a leg 44 and an arm 46 that extends generally normal from a longitudinal axis of the leg 44. The leg 44 is coupled to the inboard side wall 20. Specifically, the leg 44 is mounted to the outer side wall 38 of the side wall 20 provided on the inboard side of the seat cushion frame 16 in the vehicle lateral direction. The arm 46 includes attachment components configured to pivotally attach the inner bracket 42 and the seat cushion frame 16 to the seat back 14. As shown in FIG. 1, the pivot axis P1 extends through the outer bracket 40 and the inner bracket 42 such that the attachment of the seat cushion frame 16 to seat back 14 by the outer bracket 40 and the inner bracket 42 configures the seat cushion frame 16 to pivot about the pivot axis P1 between the seated position and the tip-up position.

The front wall 22 includes an outer front wall 50, a top front wall 52, and an inner front wall 54. The inner front wall 54 extends generally upwardly from the front edge 24 of the base wall in the vehicle vertical direction when the seat cushion frame 16 is in the seated position. The top front wall 52 extends generally outwardly from a distal edge of the inner front wall 54. The outer front wall 50 extends generally downwardly from an outer edge of the top front wall 52. The top front wall 52 is provided such that an inner edge connects to the upper edge of the inner front wall 54 and an opposite outer edge of the top front wall 52 connects to an upper edge of the outer front wall 50.

In some embodiments, the top side wall 36 and the top front wall 52 are provided so as to connect and extend as a top wall of both the pair of side walls 20 and the front wall 22. In some embodiments, the top side wall 36 and the top front wall 52 are provided generally coplanar.

Figure 3:
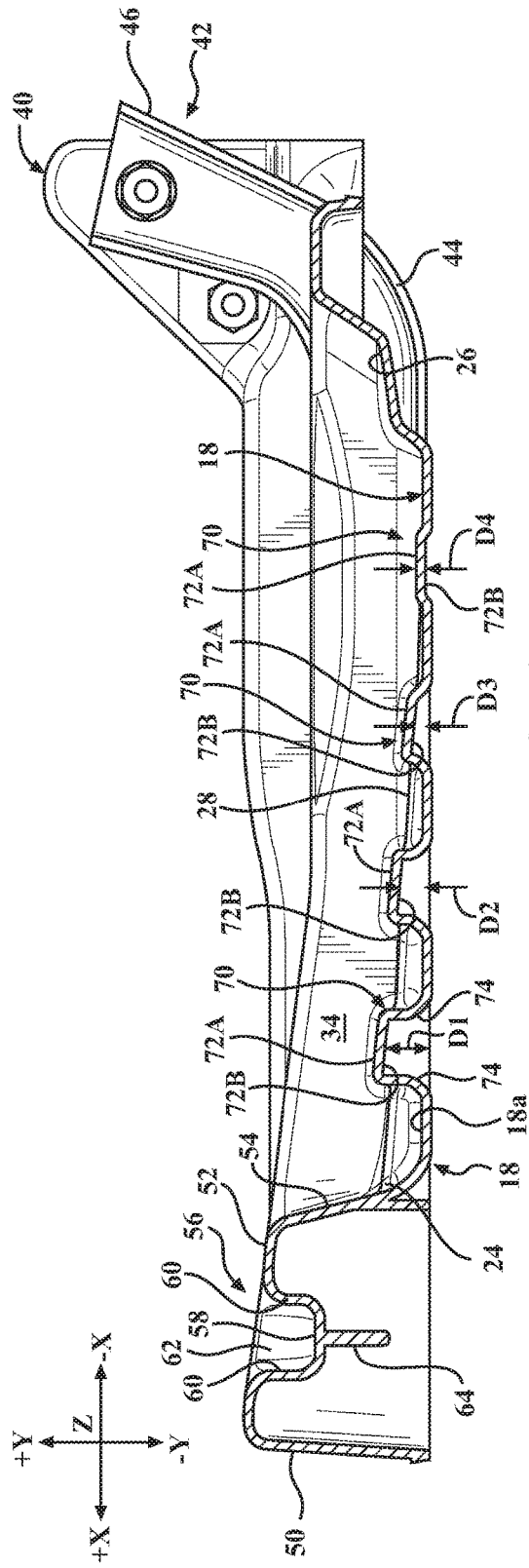
FIG. 3 schematically depicts a partial cross-sectional view of the seat assembly of FIG. 1 taken along line 3-3 of FIG. 2, according to one or more embodiments shown or described herein.
Figure 4:
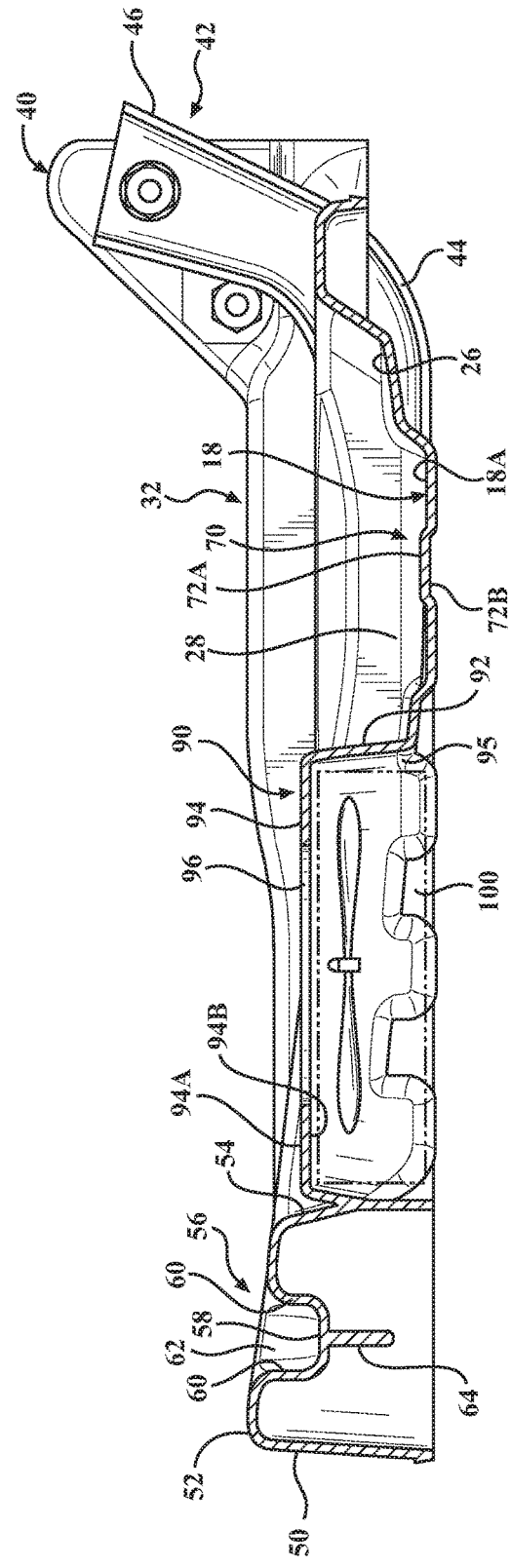
FIG. 4 schematically depicts a partial cross-sectional view of the seat assembly of FIG. 1 taken along line 4-4 of FIG. 2, according to one or more embodiments shown or described herein.

Referring to FIGS. 2, 3, and 4, the top front wall 52 includes an elongated channel 56. The elongated channel 56 is recessed with respect to the top front wall 52 to provide a strengthening reinforcement to the front wall 22. As such, the elongated channel 56 is configured to reinforce the front wall 22. The elongated channel 56 includes a bottom wall 58, a pair of side walls 60, and a pair of end walls 62. The bottom wall 58 is recessed with respect to the top front wall 52 in the vehicle vertical direction when the seat cushion frame 16 is in the seated position. The pair of side walls 60 extend from side edges of the bottom wall 58 to the top front wall 52. The pair of end walls 62 extend from ends of the bottom wall 58 to the top front wall 52. In some embodiments, a channel rib 64 may extend downwardly in the vehicle vertical direction from a lower surface of the bottom wall 58.

As shown in FIGS. 3 and 4, the front wall 22 extends upwardly above the base wall 18 and may be provided so as to extend upwardly above the pair of side walls 20. The front wall 22 provides an integrated anti-submarining feature into the seat cushion frame 16. Specifically, the extension of the front wall 22 above the base wall 18 is configured to retain an occupant supported on the seat cushion frame 16 from sliding forward and under a seat belt during a collision. The retention of the occupant supported on the seat cushion frame 16 retains the occupant from submarining with respect to a lap belt portion of the seat belt. Moreover, as the front wall 22 is integrally formed with the seat cushion frame 16, as will be described in greater detail below, the seat cushion frame 16 is provided with an integrated anti-submarining feature. As such, the assembly of the seat cushion frame 16 is simplified, as additional components are not required to be attached to the seat cushion frame 16 to provide the anti-submarining feature provided by the front wall 22.

Referring to FIGS. 2, 3, and 4, the base wall 18 is provided with a plurality of first reinforcement ribs 70 and a plurality of second reinforcement ribs 80. The plurality of first reinforcement ribs 70 and the plurality of second reinforcement ribs 80 provide strengthening reinforcement to the base wall 18. As will be described in greater detail below, the plurality of first reinforcement ribs 70 and the plurality of second reinforcement ribs 80 are integrally formed as a one piece monolithic structure with the base wall 18 and the seat cushion frame 16.

The plurality of first reinforcement ribs 70 extend in a first direction and the plurality of second reinforcement ribs 80 extend in a second direction that is different than the first direction. In some embodiments, the second direction is generally normal to the first direction. In the illustrated embodiment, each the plurality of first reinforcement ribs 70 extends in the vehicle lateral direction between the pair of side walls 20, and each of the plurality of second reinforcement ribs 80 extend discontinuously between the plurality of first reinforcement ribs 70 in the vehicle longitudinal direction. Specifically, each of the plurality of second reinforcement ribs 80 extends in the vehicle longitudinal direction between adjacent first reinforcement ribs 70 such that the plurality of second reinforcement ribs 80 are discontinuous at an intersection of the plurality of first reinforcement ribs 70 and the plurality of second reinforcement ribs 80.

The plurality of first reinforcement ribs 70 are arranged to extend in the vehicle lateral direction and spaced apart in the vehicle longitudinal direction. The plurality of first reinforcement ribs 70 have a corrugated configuration on the base wall 18. Each of the plurality of first reinforcement ribs 70 includes an upper surface 72A and an opposite lower surface 72B. The plurality of first reinforcement ribs 70 are arranged such that a height of each of the plurality of first reinforcement ribs 70 decreases as the plurality of first reinforcement ribs 70 move from the front edge 24 towards the rear edge 26. Specifically, a distance between the lower surface 72B of the plurality of first reinforcement ribs 70 and an upper surface 18A of the base wall 18 decreases as the plurality of first reinforcement ribs 70 move from the front edge 24 towards the rear edge 26.

As shown in FIG. 3, a distance D1 between the lower surface 72B of the forward most first reinforcement rib 70 and the upper surface 18A is greater than distances D2, D3, and D4 between the lower surfaces 72B of the respective rearward first reinforcement ribs 70 and the upper surface 18A.

Referring to FIGS. 1, 2 and 4, the seat cushion frame 16 includes an integrated accessory attachment portion 90. The accessory attachment portion 90 includes an annular collar 92 and a flange 94. The annular collar 92 extends generally upwardly, in the vehicle vertical direction when the seat cushion frame 16 is in the seated position, from the upper surface 18A of the base wall 18. The flange 94 extends partially and radially inwardly from an upper edge of the annular collar 92. The flange 94 includes an outer surface 94A, an opposite inner surface 94B, and an aperture 96 that extends between the outer surface 94A and the inner surface 94B. The annular collar 92 and the flange 94 define a cavity 95 which is accessible through the aperture 96.

The accessory attachment portion 90 is configured to receive and couple an accessory component 100 to the seat cushion frame 16. Specifically, the accessory component 100 is received within the cavity 95 and positioned below the aperture 96.

In some embodiments, the accessory component 100 is a fan assembly configured to provide a flow of air through the seat cushion 12 to a supported occupant. The accessory component 100, in the form of the fan assembly, includes one or more fan blades and a motor to rotate the one or more fan blades. It is appreciated, that the accessory component 100 is not limited to the fan assembly and may include other seat assembly accessory illustratively including a heater unit, a speaker, or audio unit.

As shown in FIG. 4, the accessory component 100, in the form of the fan assembly, is coupled to the inner surface 94B of the flange 94 and positioned so as to direct air through the aperture upon rotation of the one or more fan blades by the motor.

As will be described in greater detail below, the accessory attachment portion 90, including the annular collar 92 and the flange 94, is integrally formed as a one piece monolithic structure with the seat cushion frame 16. As such, the seat cushion frame 16 is provided with an integrated accessory attachment portion that allows for the coupling of the accessory component 100 without the need for additional mounts or brackets to be attached to the seat cushion frame 16. As such, the assembly of the seat cushion frame 16 is simplified, as the accessory component 100 is mounted to the seat cushion frame 16 without additional components.

As discussed above, the seat cushion frame 16 is formed of a resin material. In some embodiments, the seat cushion frame 16 is formed of a fiber-reinforced resin material. For example, the seat cushion frame 16 is formed of a glass filed nylon resin material. In some embodiments, the base wall 18, the pair of side walls 20, the front wall 22, the rear wall 23, the outer bracket 40, the plurality of first reinforcement ribs 70, the plurality of second reinforcement ribs 80, and the accessory attachment portion 90 of the seat cushion frame 16 are integrally formed as a one-piece monolithic structure. Specifically, the seat cushion frame 16 may be integrally molded from a fiber reinforced resin material as a single one-piece monolithic structure.

As discussed above, the second seat assembly 10B is similar to the first seat assembly 10A except that the second seat assembly 10B does not include the notched portion 30 and the intermediate ridge 32. In the illustrated embodiment, the second seat assembly 10B is configured to support a single occupant compared to the first seat assembly 10A which is configured to support two occupants. It is appreciated, that the first seat assembly 10A and the second seat assembly 10B are not limited to being configured to support two occupants and a single occupant, respectively.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A seat cushion for a seat assembly having a seat back, the seat cushion frame comprising:
    a seat cushion frame formed of a resin material, the seat cushion frame includes a base wall, a pair of side walls, and a front wall, the base wall includes a pair of side edges and a front edge that extends between the pair of side edges, the pair of side walls extend outward from the pair of side edges of the base wall, and the front wall extends outwardly from the front edge of the base wall and from the pair of side edges, the front wall including an outer front wall, an inner front wall, and a top front wall extending between the outer front wall and the inner front wall, the top front wall having an elongated channel recessed with respect to the top front wall, the elongated channel configured to reinforce the front wall, the front wall configured to provide an anti-submarining feature.

2. The seat cushion according to claim 1, wherein the base wall includes a plurality of reinforcement ribs that extend upwardly from the base wall.

3. The seat cushion according to claim 2, wherein the plurality of reinforcement ribs includes a plurality of first reinforcement ribs that extend in a first direction and a plurality of second reinforcement ribs that extend in a second direction different than the first direction.

4. The seat cushion according to claim 3, wherein the first direction extends generally normal to the second direction.

5. The seat cushion according to claim 4, wherein the base wall, the pair of side walls, the front wall, the plurality of first reinforcement ribs, and the plurality of second reinforcement ribs are integrally formed as a one piece monolithic structure.

6. The seat cushion according to claim 4, wherein the plurality of second reinforcement ribs are discontinuous at an intersection of the plurality of first reinforcement ribs and the plurality of second reinforcement ribs.

7. The seat cushion according to claim 4, wherein a distance between a lower surface of each of the plurality of first reinforcement ribs and an upper surface of the base wall decreases as the plurality of first reinforcement ribs extend from a front edge of the base wall to an opposite rear edge of the base wall.

8. The seat cushion according to claim 1, wherein the base wall includes an upwardly extending annular collar having an upper edge and a flange that extends radially inwardly from the upper edge of the annular collar to define an aperture.

9. The seat cushion according to claim 8, wherein the annular collar and the flange define a cavity.

10. The seat cushion according to claim 9, wherein an accessory component is received within the cavity and mounted to an inner surface of the flange.

11. The seat cushion according to claim 10, wherein the accessory component is a fan assembly configured to direct air through the aperture.

12. The seat cushion according to claim 1, wherein the resin material is a fiber-reinforced resin material.

13. The seat cushion according to claim 1 further comprising:
    an inner bracket formed of a metallic material, the inner bracket coupled to one of the pair of side walls, the inner side bracket configured to pivotally mount the seat cushion frame to the seat back; and
    an outer bracket formed as a portion of the other of the pair of side walls, the outer bracket configured to pivotally mount the seat cushion frame to the seat back.

14. The seat assembly according to claim 1, wherein the top front wall includes an outer top front wall extending between the elongated channel and the outer front wall, and an inner top front wall extending between the elongated channel and the inner front wall, a distance between the outer top front wall and the base wall is greater than a distance between the inner top front wall and the base wall.

15. A seat assembly comprising:
    a seat back; and
    a seat cushion frame pivotally coupled to the seat back, the seat cushion frame moveable between a seated position and a tip-up position in which the seat cushion frame faces the seat back, the seat cushion frame formed of a resin material, the seat cushion frame includes a base wall, a pair of side walls, and a front wall, the base wall includes a pair of side edges and a front edge that extends between the pair of side edges, the pair of side walls extend outward from the pair of side edges of the base wall, and the front wall extends outwardly from the front edge of the base wall and perpendicular from the pair of side walls, the front wall including an outer front wall, an inner front wall, and a top front wall extending between the outer front wall and the inner front wall, the top front wall having an elongated channel recessed with respect to the top front wall, the elongated channel configured to reinforce the front wall, the front wall configured to provide an anti-submarining feature.

16. The seat assembly according to claim 15, wherein the base wall includes a plurality of reinforcement ribs that extend upwardly from the base wall.

17. The seat assembly according to claim 16, wherein the plurality of reinforcement ribs includes a plurality of first reinforcement ribs that extend in a first direction and a plurality of second reinforcement ribs that extend in a second direction different than the first direction.

18. The seat assembly according to claim 17, wherein the base wall, the pair of side walls, the front wall, the plurality of first reinforcement ribs, and the plurality of second reinforcement ribs are integrally formed as a one piece monolithic structure.

19. The seat assembly according to claim 15, the top front wall includes an outer top front wall extending between the elongated channel and the outer front wall, and an inner top front wall extending between the elongated channel and the inner front wall, a distance between the outer top front wall and the base wall is greater than a distance between the inner top front wall and the base wall.

* * * * *